United States Patent
Vang

(10) Patent No.: US 9,642,220 B1
(45) Date of Patent: May 2, 2017

(54) KEYWAY ILLUMINATION SYSTEM

(71) Applicant: Nipong Vang, Wrightsville, PA (US)

(72) Inventor: Nipong Vang, Wrightsville, PA (US)

(*) Notice: Subject to any disclaimer, the term of this patent is extended or adjusted under 35 U.S.C. 154(b) by 0 days.

(21) Appl. No.: 15/296,217

(22) Filed: Oct. 18, 2016

(51) Int. Cl.
| | | |
|---|---|---|
| *H05B 37/02* | (2006.01) | |
| *F21L 4/00* | (2006.01) | |
| *F21V 23/04* | (2006.01) | |
| *F21V 5/04* | (2006.01) | |
| *F21V 7/00* | (2006.01) | |
| *F21V 13/04* | (2006.01) | |
| *H05B 33/08* | (2006.01) | |
| *F21V 33/00* | (2006.01) | |
| *E05B 17/10* | (2006.01) | |
| *E05B 19/00* | (2006.01) | |

(52) U.S. Cl.
CPC ....... *H05B 37/0227* (2013.01); *E05B 17/103* (2013.01); *E05B 19/0082* (2013.01); *F21L 4/00* (2013.01); *F21V 5/04* (2013.01); *F21V 7/00* (2013.01); *F21V 13/045* (2013.01); *F21V 23/0414* (2013.01); *F21V 33/0004* (2013.01); *H05B 33/0854* (2013.01); *H05B 33/0872* (2013.01); *H05B 37/0272* (2013.01)

(58) Field of Classification Search
CPC ............... E05B 17/103; E05B 19/0082; F21V 23/0414; H05B 37/0227; H05B 33/0272; H05B 33/0854; H05B 33/0872
See application file for complete search history.

(56) References Cited

U.S. PATENT DOCUMENTS

| | | | |
|---|---|---|---|
| 2,480,223 A | 8/1949 | Costanzo | |
| 4,293,894 A | 10/1981 | Blank | |
| 5,634,710 A | 6/1997 | Di Russo | |
| 5,729,057 A | 3/1998 | Frenzel | |
| 5,803,581 A | 9/1998 | Brockmann | |
| 2005/0259411 A1* | 11/2005 | Chen | E05B 17/103 362/116 |
| 2006/0215394 A1* | 9/2006 | Evans | E05B 17/103 362/116 |
| 2007/0159811 A1* | 7/2007 | Chen | E05B 17/103 362/116 |

* cited by examiner

*Primary Examiner* — Douglas W Owens
*Assistant Examiner* — Pedro C Fernandez
(74) *Attorney, Agent, or Firm* — Vincent G. LoTempio; Kloss, Stenger & LoTempio; David T. Stephenson

(57) ABSTRACT

A keyway illumination system is operable with different keys to enable illumination of a keyway when a matching key approaches to enhance visibility of the keyway. A smart key case detachably couples to the key to provide a gripping surface for applying torque to key, and electrical components to actuate illumination of the keyway. The key case includes a receiver, a power switch, a mode switch, and a PCB motion sensor mechanism that deactivates illumination of the key case when sensing proximity to keyway. A slave module attaches adjacently to the keyway and communicates with the key case. A light torch emits a beam of light onto the keyway. A photoresistor detects presence of light from the key case to determine activation or deactivation of light torch. Verification that the key is engaging a matching keyway is possible by matching LED colors of the key case and slave module.

20 Claims, 6 Drawing Sheets

KEYWAY ILLUMINATION SYSTEM

FIELD OF THE INVENTION

The present invention relates generally to a keyway illumination system. More so, the present invention relates to a system that enables a keyway to be illuminated when a corresponding key approaches the keyway from a predetermined distance, so as to enhance viewing the engagement between key and keyway; whereby the key is adapted to mate with a smart key case that provides both the gripping surface necessary to apply torque to the key, and the electrical communication components necessary to actuate illumination of the keyway; whereby a slave module attaches adjacently to the keyway, and communicates with the smart key case to emit a steady beam of light directly onto the keyway when detecting proximal illumination from the smart key case.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

It is known that a key is a device that is used to operate a lock (such as to lock or unlock it). A typical key is a small piece of metal consisting of two parts: the blade, which slides into the keyway of the lock and distinguishes between different keys, and the bow, which is left protruding so that torque can be applied by the user. The key serves as a security token for access to the locked area; only persons having the correct key can open the lock and gain access.

Door lock keys are devices that allow security access to its user. However, the inexpensive device can become difficult to use in locations with poor lighting, owing to weather conditions, time of day or physical orientation of the lock. To address this problem, illumination is the required solution. There are night light devices that illuminate around the keyway in conditions that ordinarily make the key's usage difficult.

A photoresistor is a light-controlled variable resistor. The resistance of a photoresistor decreases with increasing incident light intensity; in other words, it exhibits photoconductivity. A photoresistor can be applied in light-sensitive detector circuits, and light- and dark-activated switching circuits. A photoresistor can be mounted on a doorway to detect presence of illuminations from an object, such as a key case.

There is a need for a keyhole-illuminating device that provides easy access and high visibility in the dark, while requiring minimal energy expenditure. There is also a need for a reliable device that illuminates the keyway as the matching key is engaging the keyway, but powers off when the key and the keyway have completed the locking or unlocking operation. There is also a need for unobscured keyhole illumination that is easy to install and remove for relocation thereof, if desired.

Other proposals have involved illuminating keyways and doors. The problem with these illumination devices is that they do not power on and off at the right time. Also, they do not indicate if the matching key is being used in the keyway. Even though the above cited illuminating devices meets some of the needs of the market, a keyway illumination system that is adapted to operate with a variety of keys having different sizes and types, and enables a keyway to be illuminated when a corresponding key approaches the keyway at a predetermined distance, so as to enhance visibility of the engagement point between the key and the keyway, and also allows for verification that the key is engaging the correct matching keyway through a unique color matching function, is still desired.

SUMMARY

Illustrative embodiments of the disclosure are generally directed to a keyway illumination system. The keyway illumination system is adapted to operate with a variety of keys having different sizes and types. The system selectively illuminates a keyway that matches the key when the key is detected at a predetermined, proximal distance. The system also provides visual verification that the key is engaging the correct matching keyway through a unique function that matches LED colors, intensities, or patterns between a smart key case coupled to the key, and a slave module attached adjacently to the keyway.

In some embodiments, the system provides a smart key case. The smart key case is configured to receive, securely fasten, and release a key. The smart key case receives and fastens the key with the blade exposed for operation with a keyway. The key may include a standard key known in the art having a blade, which slides into the keyway of a lock and distinguishes between different keys; and the bow, which is left protruding so that torque can be applied to rotate the key in the keyway. The smart key case in essence, replaces the bow of the key. The smart key case provides the gripping surface necessary to apply torque to the key.

Furthermore, the smart key case provides the electrical and lighting communication components necessary to actuate illumination of the keyway. The smart key case has various illumination components, operational switches, and a receiver that enable communications for activating and deactivating illumination on the keyway, chiefly dependent on the proximity and illuminating status of the smart key case to the keyway.

The second major component of the system is a slave module that attaches adjacently to the keyway. The slave module is configured to communicate with the smart key case and emit a steady beam of light directly onto the keyway when detecting proximal illumination from the smart key case. In this manner, visibility of the keyway, and especially the engagement point between the blade portion of the key and the keyway is enhanced when the key is proximal to the keyway.

In one embodiment, the smart key case detachably couples to a key. The smart key case orients the key in a natural position for operation of the key through a keyway. The smart key case comprises a housing configured to detachably couple to one end of a blade of the key. In this manner, torque can be applied to the key in a keyway.

The smart key case further comprises a key illumination device configured to illuminate. The illumination from the key illumination device may include a light emitting diode that selectively emits red, yellow, and green colors. A case printed circuit board (PCB) receives electrical components and enables processing by the smart key case.

The smart key case further comprises a plurality of switches that operate the electronic components of the case PCB. A key power switch is configured to power on and power off the smart key case, including the key illumination device. A mode change feature is controlled by key power switch, to change operational modes of the smart key case. A PCB motion sensor mechanism that deactivates illumination of the key case when sensing proximity to keyway. The smart key case may further include a receiver for wireless communication with a wireless communication system, described below.

The smart key case further comprises a key power source, such as a coin battery. A power source enclosure is configured to retain the key power source. The smart key case may further include a pin hole that enables access to a locking mechanism for locking the key to the housing. Thus, enabling passage of a pin through the pinhole engages the locking mechanism, causing the key to disengage from the housing. The locking mechanism may include spring-loaded tabs that are tensioned to grip that blade of the key. The pin forces the tabs away from the blade to enable disengagement thereof.

The system may also include a slave module comprising a module housing. The module housing is adapted to attach adjacently to a keyway. A light torch may be joined with the module housing. The light torch is configured to emit a steady beam of light towards the keyway, so as to enhance visibility in the region of the keyway.

In some embodiments, the slave module further comprises a photoresistor that detects the illumination from the key illumination device. In this manner, detection of the illumination occurs at a predetermined distance. The photoresistor is operatively connected to the light torch, such that the detection of illumination from the key illumination device causes the light torch to be activated or deactivated.

The light torch is activated when the photoresistor detects the illumination from the key illumination device. Conversely, the light torch is deactivated when the illumination from the key illumination device is deactivated. Thus, illumination of the keyway by the light torch is dependent on the key illumination device of the smart key case being illuminated.

In the sequence of procedures, the user would approach the keyway with the smart key case oriented towards the slave module. The key power switch is engaged to activate the illumination from the key illumination device. The photoresistor in the slave module detects the illumination from the key illumination device, and consequently activates the light torch, which enhances visibility of the keyway.

In this event, when the key is entered, the PCB motion sensor mechanism deactivates illumination of the key case when sensing proximity to keyway. This deactivation turns off the illumination by the key illumination device on the smart key case. This causes the photoresistor to no longer detect illumination, and thereby deactivates the light torch. The key engages the keyway to turn a lock in order to unlock it, or otherwise lock it.

The slave module may further include a wireless communication system configured to transmit a signal to the receiver in the smart key case. The signal enables the slave module to identify the smart key case over the predetermined distance. This wireless communication may include a Bluetooth protocol that transmits short-wavelength UHF radio waves to the receiver in the smart key case.

The slave module may further include a module illumination device that operatively connects to the wireless communication system. Similar to the key illumination device, the module illumination device illuminates a color, intensity, or pattern. If the slave module identifies the smart key case, the illumination from the module illumination device is configured to match the color or the intensity or the pattern of the illumination from the key illumination device. Thus, when the illuminations match, the key that is coupled to the smart key case is verified to correspond to the keyway adjacent to the slave module.

In one aspect, a keyway illumination system comprises:
a key defined by a blade, the blade configured to enable accessibility;
a smart key case comprising:
a housing configured to detachably couple to the key, the housing further configured to enable application of torque on the key,
a key illumination device configured to illuminate,
a key power switch configured to power on and power off the smart key case, the key power switch further configured to change operational modes of the smart key case,
PCB motion sensor mechanism configured to deactivate illumination of the key illumination device,
a receiver configured to enable wireless communication; and
a slave module comprising:
a module housing,
a light torch configured to emit a steady beam of light,
a photoresistor configured to detect the illumination from the key illumination device, whereby detection of the illumination occurs at a predetermined distance, the photoresistor operatively connected to the light torch,
whereby the light torch is activated when the photoresistor detects the illumination from the key illumination device,
whereby the light torch is deactivated when the illumination from the key illumination device is deactivated,
a wireless communication system configured to transmit a signal to the receiver,
whereby the signal enables the slave module to identify the smart key case over the predetermined distance,
a module illumination device configured to operatively connect to the wireless communication system, the module illumination device further configured to illuminate,
whereby the illumination from the module illumination device is configured to match the color or the intensity or the pattern of the illumination from the key illumination device when the slave module identifies the smart key case.

In another aspect, the blade of the key is configured to enable accessibility to a keyway.

In another aspect, the key is a vehicle key.

In another aspect, the housing of the smart key case is configured to receive one end of the blade.

In another aspect, the key illumination device is a light emitting diode.

In another aspect, the illumination from the key illumination device comprises the colors of red, yellow, and green.

In another aspect, the smart key case further comprises a case printed circuit board.

In another aspect, the smart key case further comprises a key power source.

In another aspect, the key power source comprises a coin battery.

In another aspect, the smart key case further comprises power source enclosure configured to retain the key power source.

In another aspect, the smart key case further comprises a pin hole that enables access to a locking mechanism for locking the key to the housing, whereby enabling passage of a pin through the pinhole engages the locking mechanism, causing the key to disengage from the housing.

In another aspect, the photoresistor is configured to detect a visible light, an ultraviolet light, or an infrared light.

In another aspect, the light torch comprises a lens and a reflector.

In another aspect, the slave module further comprises a module printed circuit board.

In another aspect, the slave module further comprises a module power switch.

In another aspect, the slave module further comprises a module mode switch.

In another aspect, the slave module further comprises a module power source.

In another aspect, the module illumination device is a light emitting diode.

In another aspect, the illumination from the module illumination device comprises the colors of red, yellow, and green.

In another aspect, the wireless communication system is configured to operate with short-wavelength UHF radio waves.

In another aspect, the slave housing is mounted adjacent to the keyway.

In another aspect, the light torch is oriented to direct the beam of light directly at the keyway.

One objective of the present invention is to illuminate a dark area near a keyway of a vehicle as the key moves proximally to the keyway.

Another objective is to verify that the key is engaging a matching keyway.

Another objective is to provide a smart key case that supplements the bow of a key to enable turning the key in the keyway, and also communicates with the slave module to actuate the light torch.

Yet another objective is to indicate through Bluetooth communication and matching LED lights on the smart key case and the slave module, the matching key for the keyway.

Yet another objective is to provide an inexpensive, easily accessible power source for the smart key case and the slave module.

Yet another objective is to display a vehicle brand name on the housing of the smart key case.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1A:
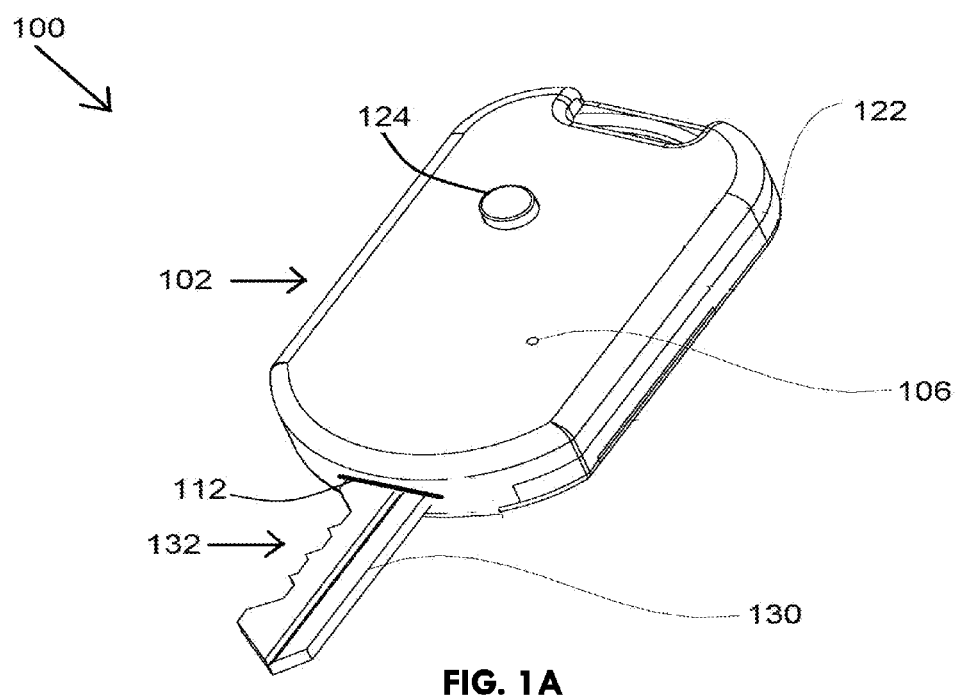
FIGS. 1A and 1B illustrate a perspective view of an exemplary keyway illumination system, showing a smart key case, a key, and a slave module, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A keyway illumination system 100 is referenced in FIGS. 1A-7. The keyway illumination system 100, hereafter "system 100" is operable with different types, models, and purposes of keys 132. System 100 selectively illuminates a keyway 300 that matches the key 130 when key 132 is detected at a predetermined, proximal distance from keyway 300. System 100 also provides visual verification that key 132 is engaging the correct matching keyway 300 through a unique function that matches LED colors, intensities, or patterns between a smart key case 102 coupled to the key 132, and a slave module 200 attached adjacently to the keyway 300.

Figure 1B:
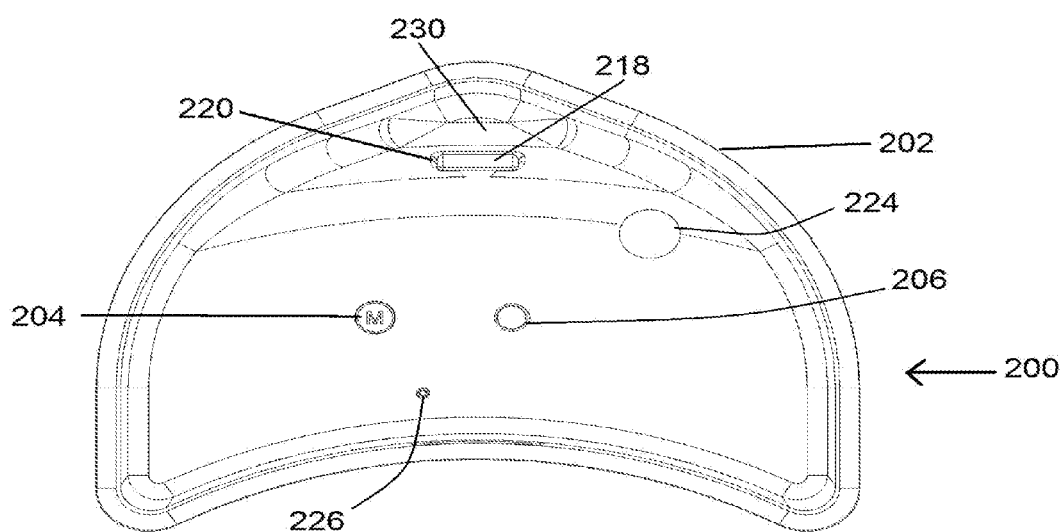

As referenced in FIGS. 1A and 1B, the system 100 may be adapted to operate with a variety of keys having different sizes and types. Those skilled in the art will recognize that a key is a tool that is used to operate a lock, such as to lock or unlock it. A typical key may be a small piece of metal consisting of two parts: the blade 130, which slides into the keyway 300 of the lock and distinguishes between different keys; and the bow, which is left protruding so that torque can be applied during rotation through the keyway 300. The key 132, as used here may open various objects, including, without limitation, a vehicle door, a building door, a display, a box, a luggage, a safe, and a window.

System 100 enables a keyway 300 to be illuminated when the corresponding key 132 approaches the keyway 300 at a predetermined distance. This selective lighting allows for enhanced visibility of an engagement point between the key 132 and the keyway 300. This type of lighting may be especially useful at night or in dark areas where visibility is limited. System 100 also allows for verification that the key 132 is engaging the correct matching keyway 300 through a unique LED color matching function. This can be useful when multiple objects having keyways are clustered together and it is not certain which keyway the key fits.

Figure 2:
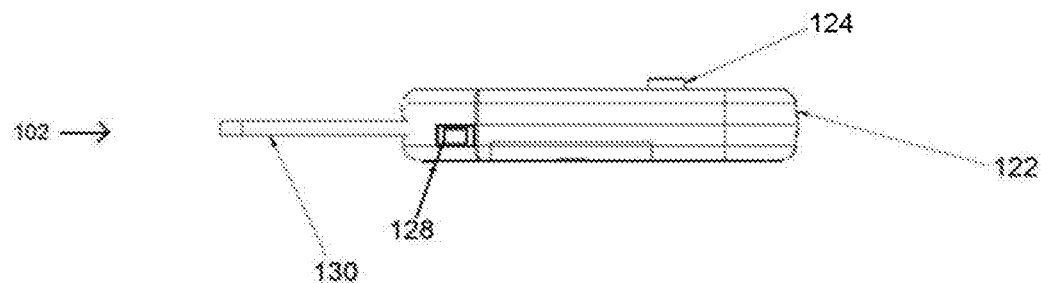
FIG. 2 illustrates an elevated side view of a smart key case, in accordance with an embodiment of the present invention.

As illustrated in FIG. 2, system 100 comprises a smart key case 102 that detachably couples to key 132 to provide a gripping surface for applying torque to the key when engaging the keyway 300. Smart key case 102 orients the key 132 in a natural position for operation of the key through a keyway 300. Smart key case 102 also serves to contain and enable control of electrical components that selectively illuminate and communicate to actuate illumination of the keyway 300.

Figure 3:
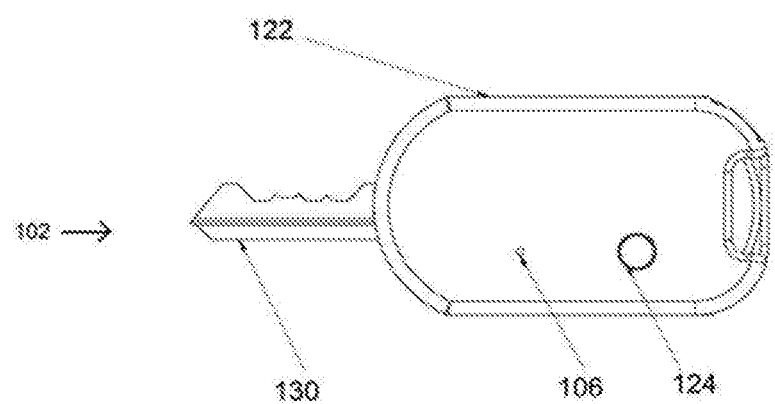
FIG. 3 illustrates a top view of a smart key case, in accordance with an embodiment of the present invention.

In one embodiment shown in FIG. 3, smart key case 102 comprises a housing 122 configured to detachably couple to the key 132. In one embodiment, housing 122 is bifurcated, and uses a plurality of fasteners 114 to fasten the two halves of the housing 122 around the internal components and the key 132. Fasteners 114 may include, without limitation, screws, bolts, magnets, or an adhesive.

Figure 4:
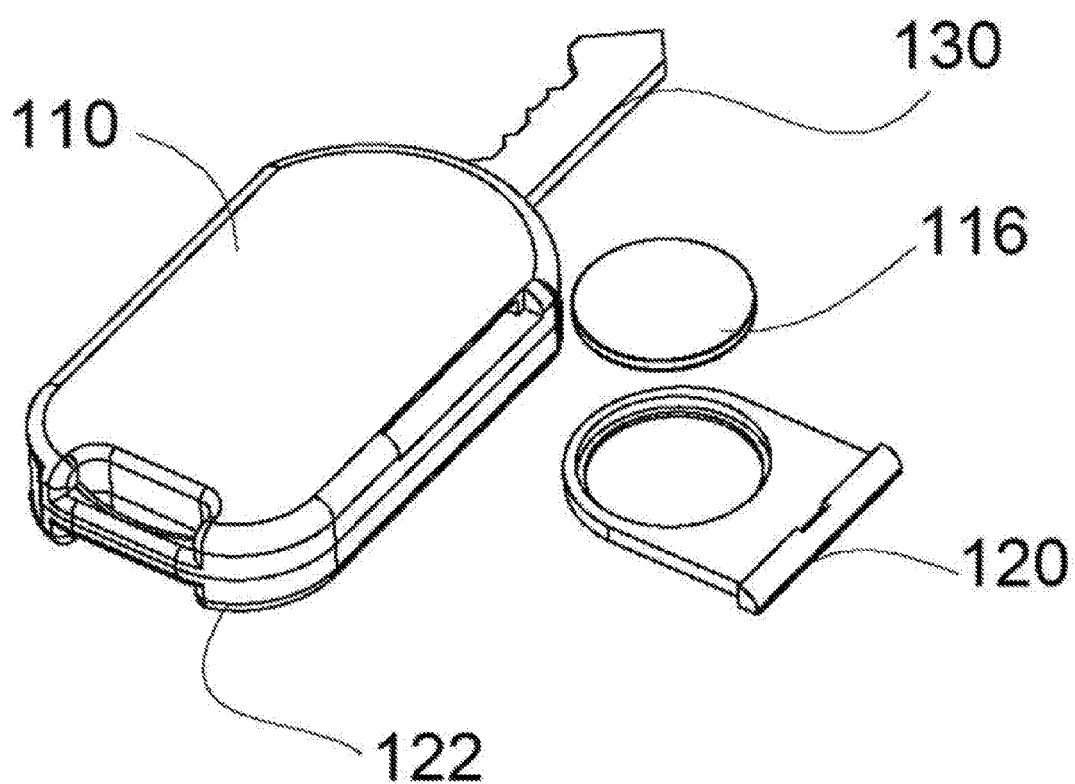
FIG. 4 illustrates a bottom view of a smart key case with the power source detached, in accordance with an embodiment of the present invention.

As shown in FIG. 4, housing 122 has a slot 112 that receives one end of the blade 130. The housing allows for a portion of blade 130 to extend from housing 122, so as to engage keyway 300. Generally, a bow end of the key 132 is encapsulated in the housing 122, while the blade 130 and the serrated edges are exposed for engaging the keyway 300. Slot 112 is sized to snugly receive the blade 130, and has a rigid perimeter that is strong enough to withstand torque from rotating the key in a keyway 300.

In some embodiments, a locking mechanism 128 securely retains the blade 130 of the key 132 inside housing 122. Locking mechanism 128 fastens and unfastens the key 132 and the housing 122. Locking mechanism 128 may include a plurality of spring-biased tabs that are tensioned to grip the edges of the blade 130.

Figure 6A:
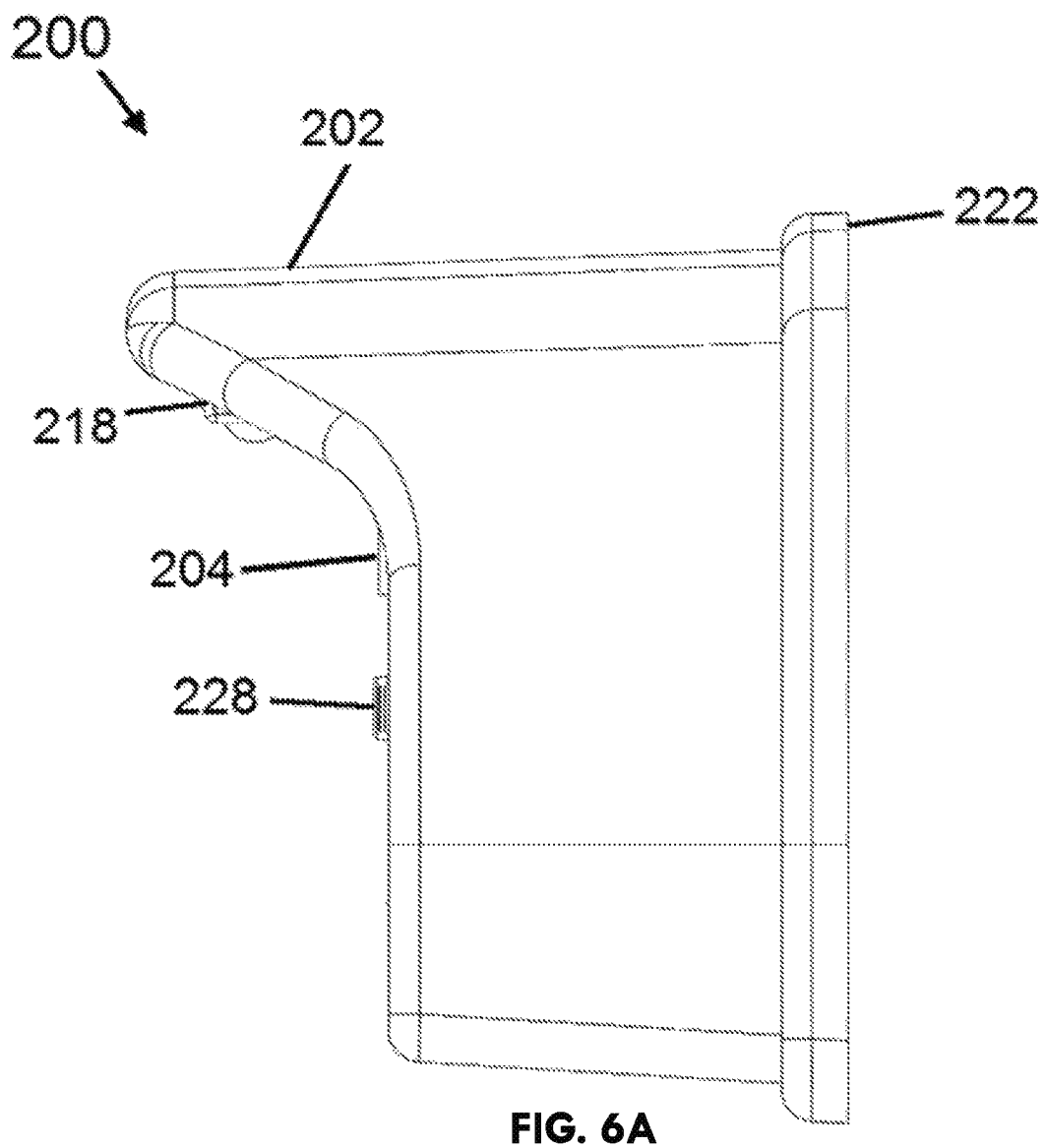
FIGS. 6A and 6B illustrate an elevated side view of an exemplary slave module mounted above a keyway, in accordance with an embodiment of the present invention.
Figure 6B:
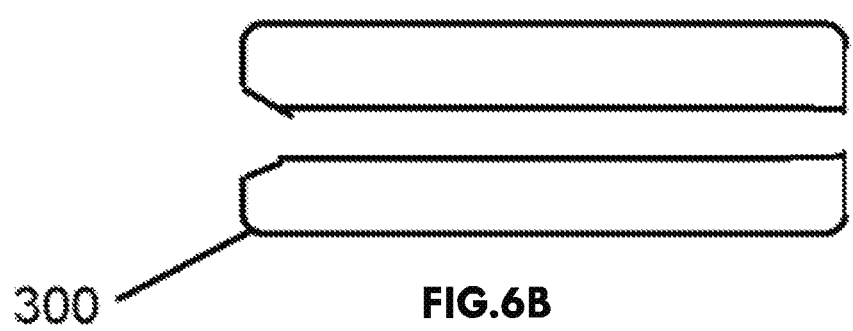

In some embodiments, housing 122 has pin hole 106 that enables access to the locking mechanism 128 for fastening the key to the housing 122. In this embodiment, a pin or rod can be used to pass through the pin hole 106. The pin then engages the locking mechanism 128. The pin presses the tabs away from the blade 130 causing blade 130 of the key 132 to disengage from housing 122. Unlocking the locking mechanism 128 may cause a portion of housing 122 to open and expose the key 132 for removal from the smart key case 102 (FIGS. 6A and 6B).

However, in other embodiments, locking mechanism 128 may operate through other means, including a magnet, a screw, and a friction fit engagement between the blade 130 and the inner workings of the housing 122. By securely fastening blade 130 into housing 122 in this manner, torque can be applied to the key 132 for rotating in a keyway 300.

Figure 5:
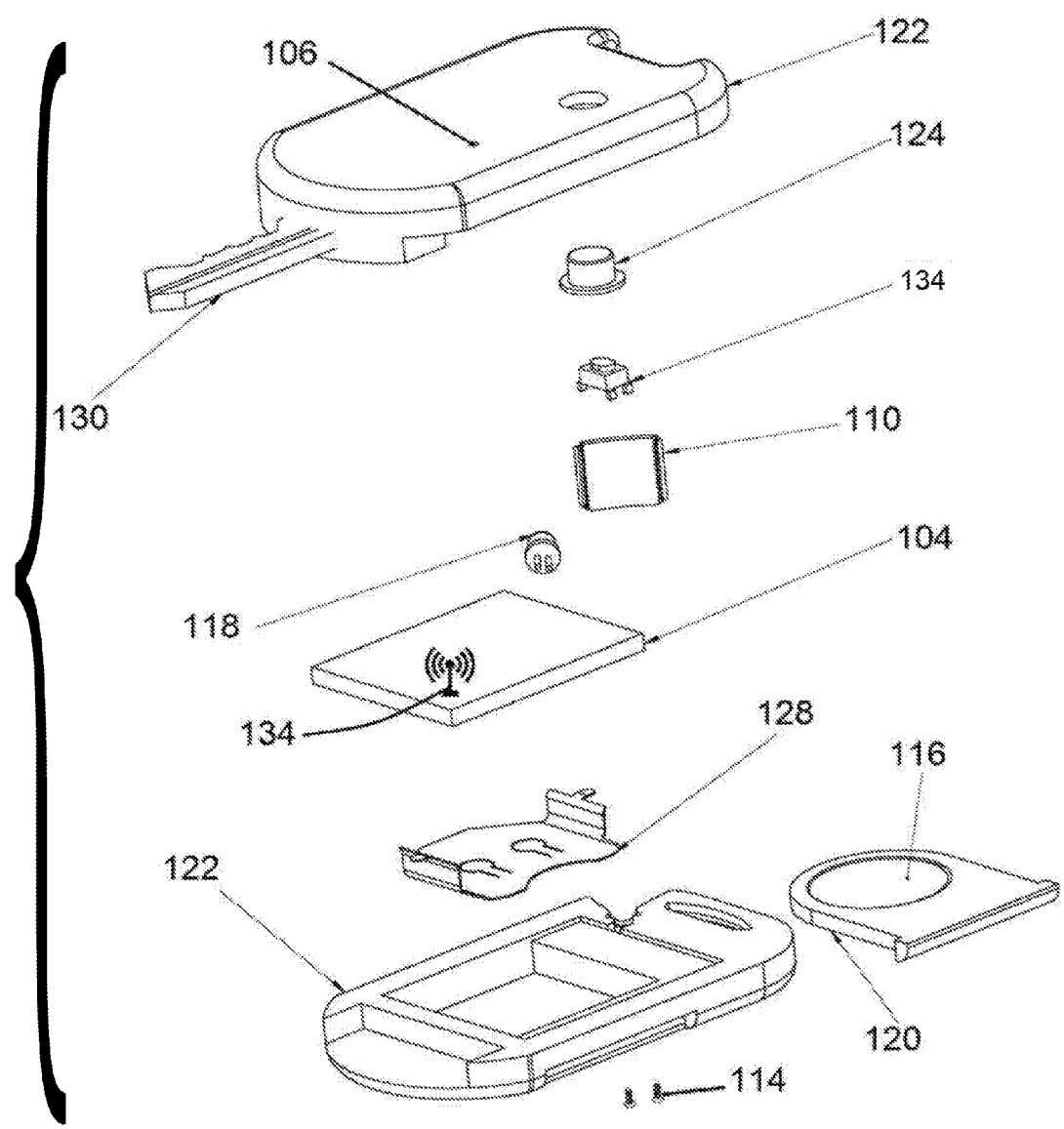
FIG. 5 illustrates a blow up view of a smart key case, highlighting the internal components, in accordance with an embodiment of the present invention.

Turning now to FIG. 5, smart key case 102 comprises a key illumination device 118 configured to selectively illuminate based on an event. In one embodiment, the illumination from key illumination device 118 is generated from a light emitting diode that selectively emits red, yellow, and green colors. In another embodiment, key illumination device 118 is a five millimeter LED that provides efficient illumination with a very low consumption of battery life.

In one embodiment, smart key case 102 further comprises a case printed circuit board (PCB) 104 that carries the various electrical components and wiring, and enables simple processing by smart key case 102. In one embodiment, case PCB 104 is plastic wafers that houses electronic components, and contains lead soldering and copper traces. Case PCB 104 may have dimensions of 20.5×27.5×2 millimeters. In one embodiment, a rubber panel 110 positions between case PCB 104 and housing 122 to protects the case PCB 104 from static charge and electric conduction.

Smart key case 102 further comprises a plurality of switches 116, 124 that operate the electronic components of the case PCB 104. This may include three unique switches that perform different functions upon being depressed, toggled, or flipped. One of the switches is a key power switch 124 that regulates power to smart key case 102, including the key illumination device 118.

In some embodiments, a mode change feature is operable with the key power switch 124, creating a two-in-one switching capacity for the key power switch 124. The mode change feature enables switching between different operational modes of the smart key case 102. For example, one mode may require manual powering on and off. Another mode may alter the coloring scheme of the key illumination device 118. Other embodiments may utilize any variety of modes for the smart key case 102.

In one embodiment, a PCB motion sense/sleep mechanism deactivates the illumination from the key illumination device 118 by sensing motion or proximity of a surface, such as the keyway 300. For example, detecting the keyway 300 in proximity deactivates the illumination by the key illumination device 118, which has further consequences discussed below. Smart key case 102 may further include a receiver 134 for wireless communication with a wireless communication system 212, described below. Receiver 134 may include an antenna that is configured to receive radio waves, and specifically short range waves.

Through use of the switches 116, 124, illumination is selectively operable and does not cause any visible distraction or disturbance when not in use, as well as during usage. Smart key case 102 needs to be switched on by pressing the key power switch 124, or a 'boot switch'. This turns on the key illumination device 118 to provide the required illumination. Further, the various modes can be selected by depressing key power switch 124 to achieve the desired modes of operation, according to its program.

One exemplary embodiment of switches 116, 124 may include three plastic push buttons labeled as follows: a boot switch that turns on the smart key; a mode switch that allows changing various operational modes of the system 100; and a north switch that depresses against a door knob to turn off the light torch emitting diode's illumination. Though other types of buttons, toggles, levers; and labeling thereof may be used in other embodiments.

Smart key case 102 further comprises a key power source 116, such as a coin battery. In one embodiment, key power source 116 is a coin shaped cell (CR1616), or a small three volt disposable lithium cell that serves as a power source for the electronic components in the smart key case 102. A power source enclosure 120 is configured to retain the key power source 116.

Smart key case 102 may contain a power source enclosure 120 having positive and negative terminals to enhance conduction of the key power source 116. Key power source 116 slides into such a power source enclosure 120. Though in other embodiments, any battery enclosure known in the art may be used.

Figure 7:
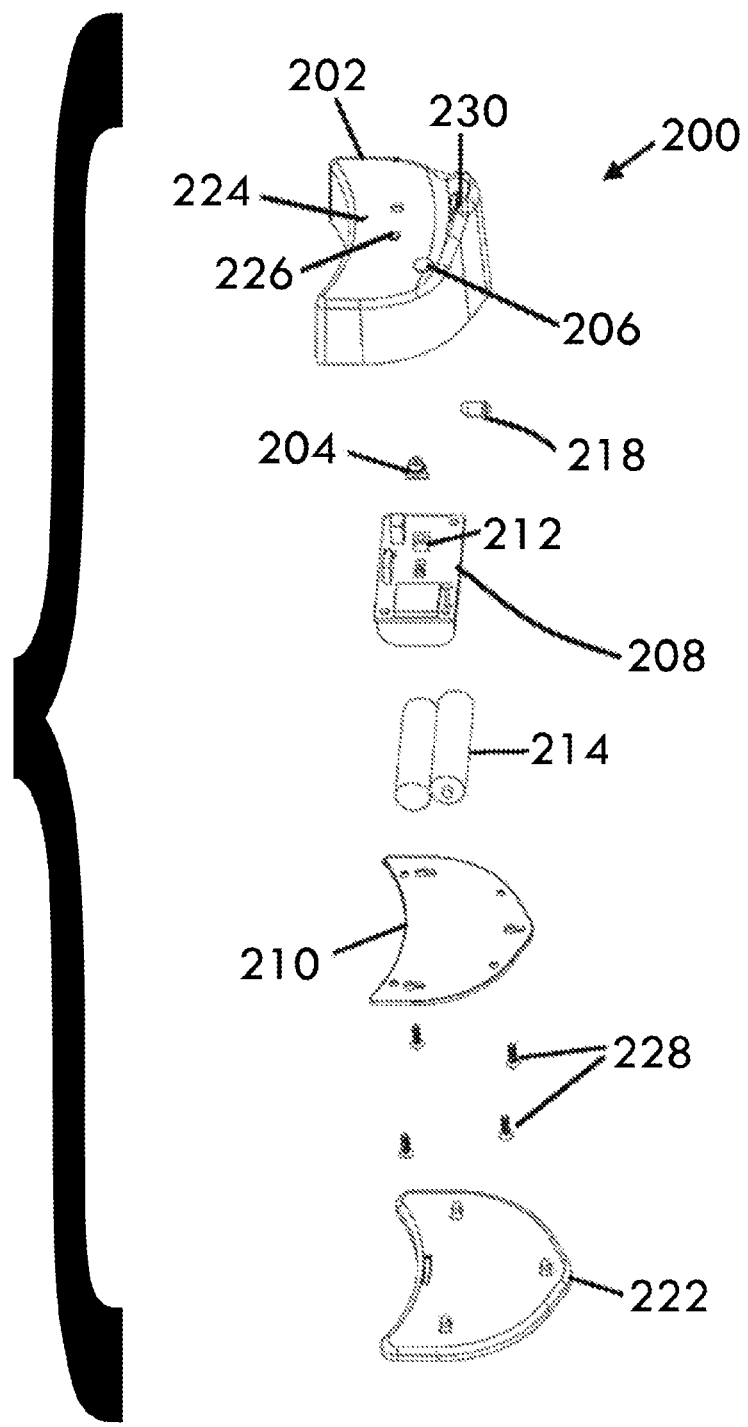
FIG. 7 illustrates a blow up view of a slave module, in accordance with an embodiment of the present invention.

Turning now to FIG. 7, system 100 further comprises the second major component of the system 100. A slave module 200 attaches adjacently to the keyway 300, and is configured to communicate with the smart key case 102 and, through a light torch 218, emit a steady beam of light directly onto the keyway 300 when detecting illumination from the key illumination device 118 on smart key case 102. In this manner, visibility of keyway 300, and especially the engagement point between the blade 130 portion of key 132 and the keyway 300 is enhanced when smart key case 102 is brought proximal to the keyway 300.

As FIGS. 6A and 6B illustrate, slave module 200 comprises a module housing 202 having a generally arced shape that follows the contour of the keyway 300, doorknob, or other keyway 300 mechanism. Module housing 202 is adapted to attach adjacently and proximally to the keyway 300. In one embodiment, module housing 202 forms an outer cover enclosure. A mounting plate 222 may secure module housing 202 to wall or mounting surface. Module housing 202 may be fabricated from a plastic or non-conductive composite metal part that houses the components of slave module 200. Module housing 202 is mountable, and such can be stuck to door surfaces near a door knob. A plurality of module fasteners 228, such as screws may be used to fasten module housing 202 and mounting plate 222.

In some embodiments, a light torch 218 may be joined with the module housing 202. Light torch 218 is configured to emit a steady beam of light towards the keyway 300, so as to enhance visibility in the region of the keyway 300. Light torch 218 may include a light emitting diode that shines brightly light on the keyway 300. Light torch 218 may have any number of colors and patterns, known in the art. Light torch 218 is controlled by other components of the slave module 200, as described below.

In some embodiments, a lens 220 and a reflector 230 may be positioned in front of the light torch 218 to enhance the translucence of the light beam. Lens 220 and reflector 230 are reflective. This reflective configuration helps an LED to illuminate the entirety of the smart key case 102, or FOB in some cases.

Looking now at FIG. 7, slave module 200 has a photoresistor 226, or a light dependent resistor (LDR), which is a light activated sensor that functions upon detecting visible light from the signaling light emitting diode of the key case. The illumination from the signaling light emitting diode in smart key case 102 generates a signal in slave module 200 that actuates the light torch 218.

In this manner, detection of the illumination occurs at a predetermined distance. Photoresistor 226 is operatively connected to light torch 218, such that the detection of illumination from key illumination device 118 causes light torch 218 to be activated or deactivated. In one embodiment, photoresistor 226 is a light activated sensor that functions upon detecting visible, UV or IR light. In this case, to detect illumination from smart key case's 102 LED (key illumination device 118).

As discussed above, light torch 218 is activated when the photoresistor 226 detects the illumination from the key illumination device 118. Conversely, light torch 218 is deactivated when the illumination from key illumination device 118 is deactivated. This can occur when PCB motion sensor mechanism detects proximity of keyway 300. Thus, illumination of the keyway 300 by the light torch 218 is dependent on key illumination device 118 of smart key case 102 being illuminated.

For example, once smart key case 102 is in proximity of slave module 200 that is attached to a door of the vehicle, the photoresistor 226 inside slave module 200 responds to the illumination from key illumination device 118 in smart key case 102. This results in light torch 218 emitting a steady beam towards keyway 300. The signaling illumination from key illuminating device 118 also illuminates to indicate to the user, thereby identifying the keyway 300. In this manner, the system's 100 design principle is to accommodate any standard key, and especially a vehicle key. The door mountable slave module 200 is similarly designed for convenience such that it can be attached above a door lock in a vehicle.

In one sequence of procedure, the user would approach the keyway 300 with the smart key case 102 oriented towards the slave module 200. The key power switch 124 is engaged to activate the illumination from the key illumination device 118. The photoresistor 226 in the slave module 200 detects the illumination from the key illumination device 118, and consequently activates the light torch 218, which enhances visibility of the keyway 300.

In this event, when the key 132 is entered into keyway 300, the PCB motion sensor mechanism detects proximity to keyway 300. Key 132 may engages keyway 300 in this manner to turn a lock in order to unlock it, or otherwise lock it. The resultant deactivation of illumination from key illumination device causes photoresistor 226 in slave module 200 to no longer detect illumination, and thereby slave module 200 deactivates light torch 218.

Slave module 200 may further include a wireless communication system 212 configured to transmit a signal to receiver 134 in the smart key case 102. The signal enables slave module 200 to identify smart key case 102 over the predetermined distance. This wireless communication may include a Bluetooth protocol that transmits short-wavelength UHF radio waves to the receiver 134 in smart key case 102.

Looking again at FIG. 7, slave module 200 comprises a module illumination device 224 that operatively connects to the wireless communication system 212. Module illumination device 224 may include a rectangular 5×2 millimeter LED that requires little battery power. Similar to key illumination device 118, the module illumination device 224 works to illuminate a color, intensity, or pattern. If slave module 200 identifies smart key case 102, the illumination from module illumination device 224 is configured to match the color or the intensity or the pattern of the illumination from key illumination device 118.

For example, when both key illumination device 118 and module illumination device 224 are green, that means that wireless communication system 212 has identified the receiver in the smart key case 102 as being associated with the appropriate key for keyway 300. In this manner, when the illuminations match, the key that is coupled to smart key case 102 is verified to correspond to keyway 300 adjacent to the slave module 200.

Slave module 200 may also comprise a module PCB 208. Similar to the case PCB 104, the module PCB 208 carries the various electrical components and wiring, and enables simple processing by slave module 200. In one embodiment, module PCB 208 is a plastic wafer that houses electronic components and contains lead soldering and copper traces. The dimensions of module PCB 208 may be 32×60×2 millimeters.

Slave module 200 further comprises two switches 204, 206 that operate the electronic components of the module PCB 208. This may include two plastic buttons that perform different functions upon being depressed, toggled, or flipped. One of the switches is a module power switch 204 that regulates power to the slave module 200, including the module illumination device 224.

Another switch is a module mode switch 206 that changes between different operational modes of the smart key case 102. For example, one mode may require manual powering on and off. Another mode may alter the coloring scheme of the key illumination device 118. Other embodiments may utilize any variety of modes for smart key case 102.

In one embodiment, a module power source 214 powers the slave module 200. The module power source 214 may include a pair of 1.5 Volt AA batteries. A module power source cover 210 may encapsulate module power source 214 for protection and to reduce heat. In one embodiment, module power source cover 210 includes a top half and a bottom half. Though any protective battery enclosure known in the art may be used.

All parts listed are classified based on their market availability, where they are identified as commercial off the shelf (COTS) parts. Production requires assembly of all parts besides the PCBs and the Outer coverings. These have to be essentially manufactured according to their dimensions and specifications.

Manufacturing variation by design is limited to the PCB and the Outer coverings. Variations are governed by the dimensions of the underlying parts of both devices. These variations shall however inherit the principal purpose. There shall be no functional design variations for the PCB or the enclosure casing. Other variations may exist based on style.

The smart key case 102 design principle is to accommodate any patented key conveniently. The door mountable slave module 200 is similarly designed for convenience such that it can be attached above a door lock.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A keyway illumination system, the system comprising:
   a key defined by a blade, the blade configured to enable accessibility;
   a smart key case having:
   a housing configured to detachably couple to the key, the housing further configured to enable application of torque on the key,
   a key illumination device configured to illuminate,
   a key power switch configured to power on and power off the smart key case, the key power switch further configured to change operational modes of the smart key case,
   a receiver configured to enable wireless communication; and
   a slave module having:
   a module housing,
   a light torch configured to emit a steady beam of light,
   a photoresistor configured to detect the illumination from the key illumination device, whereby detection of the illumination occurs at a predetermined distance, the photoresistor operatively connected to the light torch,
   whereby the light torch is activated when the photoresistor detects the illumination from the key illumination device,
   whereby the light torch is deactivated when the illumination from the key illumination device is deactivated,
   a wireless communication system configured to transmit a signal to the receiver,
   whereby the signal enables the slave module to identify the smart key case over the predetermined distance,
   a module illumination device configured to operatively connect to the wireless communication system, the module illumination device further configured to illuminate,
   whereby the illumination from the module illumination device is configured to match the color or the intensity or the pattern of the illumination from the key illumination device when the slave module identifies the smart key case.

2. The system of claim 1, wherein the housing of the smart key case is configured to receive one end of the blade through a slot.

3. The system of claim 1, wherein the housing comprises a pin hole.

4. The system of claim 3, further comprising a locking mechanism configured to fasten and unfasten the key and the housing.

5. The system of claim 4, wherein the pin hole is configured to enable access to the locking mechanism, whereby enabling passage of a pin through the pinhole engages the locking mechanism, causing the key to disengage from the housing.

6. The system of claim 1, wherein the housing comprises a plurality of fasteners.

7. The system of claim 1, wherein the illumination from the key illumination device comprises the colors of red, yellow, and green.

8. The system of claim 1, wherein the slave module further comprises a PCB motion sensor mechanism.

9. The system of claim 1, wherein the smart key case further comprises a case printed circuit board.

10. The system of claim 1, wherein the smart key case further comprises a key power source.

11. The system of claim 10, wherein the key power source comprises a coin battery.

12. The system of claim 11, wherein the smart key case further comprises power source enclosure configured to retain the key power source.

13. The system of claim 1, wherein the photoresistor is configured to detect a visible light, an ultraviolet light, or an infrared light.

14. The system of claim 1, wherein the light torch comprises a lens and a reflector.

15. The system of claim 1, wherein the slave module further comprises a module printed circuit board.

16. The system of claim 1, wherein the slave module further comprises a module power switch.

17. The system of claim 1, wherein the slave module further comprises a module mode switch.

18. The system of claim 1, wherein the signal from the wireless communication system a short-wavelength UHF radio wave.

19. A keyway illumination system, the system comprising:
   a key defined by a blade, the blade configured to enable accessibility;
   a smart key case having:
   a housing configured to detachably couple to the key, the housing further configured to enable application of torque on the key, the housing comprising a pin hole,
   a locking mechanism configured to fasten and unfasten the key and the housing,
   whereby the pin hole is configured to enable access to the locking mechanism, whereby enabling passage of a pin through the pinhole engages the locking mechanism, causing the key to disengage from the housing,
   a key illumination device configured to illuminate, a key power switch configured to power on and power off the smart key case, the key power switch further configured to change operational modes of the smart key case, a PCB motion sensor mechanism configured to deactivate the illumination of the key illumination device, a receiver configured to enable wireless communication; and a slave module having:

a module housing having a mounting plate, a light torch configured to emit a steady beam of light, the light torch comprising a lens and a reflector, a photoresistor configured to detect the illumination from the key illumination device, whereby detection of the illumination occurs at a predetermined distance, the photoresistor operatively connected to the light torch, whereby the light torch is activated when the photoresistor detects the illumination from the key illumination device, whereby the light torch is deactivated when the illumination from the key illumination device is deactivated, a wireless communication system configured to transmit a short-wavelength UHF radio waves to the receiver, whereby the short-wavelength UHF radio waves enable the slave module to identify the smart key case over the predetermined distance, a module illumination device configured to operatively connect to the wireless communication system, the module illumination device further configured to illuminate, whereby the illumination from the module illumination device is configured to match the color or the intensity or the pattern of the illumination from the key illumination device when the slave module identifies the smart key case, a module printed circuit board, a module power switch, a module mode switch.

20. A keyway illumination system, the system comprising:

a keyway;

a key defined by a blade, the blade configured to enable accessibility to the keyway;

a smart key case having:

a housing configured to detachably couple to the key, the housing further configured to enable application of torque on the key for accessing the keyway, the housing comprising a pin hole, a locking mechanism configured to fasten and unfasten the key and the housing, whereby the pin hole is configured to enable access to the locking mechanism, whereby enabling passage of a pin through the pinhole engages the locking mechanism, causing the key to disengage from the housing, a key illumination device configured to illuminate, a key power switch configured to power on and power off the smart key case, the key power switch further configured to change operational modes of the smart key case, a PCB motion sensor mechanism configured to deactivate the illumination of the key illumination device, a receiver configured to enable wireless communication; and a slave module having:

a module housing, a light torch configured to emit a steady beam of light towards the keyway, the light torch comprising a lens and a reflector, a photoresistor configured to detect the illumination from the key illumination device, whereby detection of the illumination occurs at a predetermined distance, the photoresistor operatively connected to the light torch, whereby the light torch is activated when the photoresistor detects the illumination from the key illumination device, whereby the light torch is deactivated when the illumination from the key illumination device is deactivated, a wireless communication system configured to transmit a short-wavelength UHF radio waves to the receiver, whereby the short-wavelength UHF radio waves enable the slave module to identify the smart key case over the predetermined distance, a module illumination device configured to operatively connect to the wireless communication system, the module illumination device further configured to illuminate, whereby the illumination from the module illumination device is configured to match the color or the intensity or the pattern of the illumination from the key illumination device when the slave module identifies the smart key case, a module printed circuit board, a module power switch, a module mode switch.

\* \* \* \* \*